US011256997B2

(12) United States Patent
Subasi

(10) Patent No.: US 11,256,997 B2
(45) Date of Patent: Feb. 22, 2022

(54) CURIOSITY ADAPTIVE AMBIENT SEMANTIC INTELLIGENCE SYSTEM AND METHOD FOR SCIENTIFIC COLLABORATION

(71) Applicant: Ahmet Subasi, Istanbul (TR)

(72) Inventor: Ahmet Subasi, Istanbul (TR)

(73) Assignee: Ahmet Subasi, Istanbul (TR)

( * ) Notice: Subject to any disclaimer, the term of this patent is extended or adjusted under 35 U.S.C. 154(b) by 781 days.

(21) Appl. No.: 15/254,780

(22) Filed: Sep. 1, 2016

(65) Prior Publication Data

US 2017/0061302 A1 Mar. 2, 2017

Related U.S. Application Data

(60) Provisional application No. 62/212,696, filed on Sep. 1, 2015.

(51) Int. Cl.
*G06N 5/04* (2006.01)
*G06F 16/901* (2019.01)
*G06Q 10/10* (2012.01)

(52) U.S. Cl.
CPC ......... *G06N 5/046* (2013.01); *G06F 16/9024* (2019.01); *G06Q 10/101* (2013.01)

(58) Field of Classification Search
CPC ... G06N 6/046; G06F 16/9024; G06Q 10/101
See application file for complete search history.

(56) References Cited

U.S. PATENT DOCUMENTS

| 2012/0095977 A1* | 4/2012 | Levin | G06F 16/9535 707/706 |
| 2015/0100599 A1* | 4/2015 | Ramakrishnan | G11B 27/105 707/767 |
| 2015/0120717 A1* | 4/2015 | Kim | G06F 16/335 707/727 |

OTHER PUBLICATIONS

Wu et al. ("Modeling Curiosity-Related Emotions for Virtual Peer Learners", IEEE Computational Intelligence Magazine, May 2013, pp. 50-62) (Year: 2013).*
Widyantoro et al. ("A Fuzzy Ontology-based Abstract Search Engine and Its User Studies", 2001 IEEE International Fuzzy Systems Conference, pp. 1291-1294) (Year: 2001).*
Qiong Wu ("Modeling Curiosity for Intelligent Agents", PHD Dissertation, School of Computer Engineering, Nanyang Technological University, Aug. 2014, pp. 1-160) (Year: 2014).*

(Continued)

*Primary Examiner* — Miranda M Huang
*Assistant Examiner* — Robert Lewis Kulp
(74) *Attorney, Agent, or Firm* — Bayramoglu Law Offices LLC

(57) ABSTRACT

Curiosity-adaptive ambient semantic intelligence systems and methods provide an ontology-driven graph database comprising machine-processable semantic representations of intellectual resources in the form of Curiosity Attracting Pointers (CAPs). The system also utilizes formal semantics that enable the system to automatically add new CAPs through reasoners. The users score their CAP entries based on various parameters. Curiosity traits are derived through the analysis of selectivity patterns of the users. User-scoring and curiosity value of resources are used by a calculation module to assign an overall Curiosity Satisfaction Value, which enables the personalization of output graphs generated by the system for a given user.

10 Claims, 9 Drawing Sheets

(56) References Cited

OTHER PUBLICATIONS

Widyantoro et al. ("A Fuzzy Ontology-based Abstract Search Engine and Its User Studies", 2001 IEEE International Fuzzy Systems Conference, 2001, pp. 1291-1294) (Year: 2001).*

Tang et al. ("Smart Recommendation for an Evolving E-Learning System: Architecture and Experiment", International Journal of E-learning 4, No. 1, 2005, pp. 105-129) (Year: 2006).*

Drazdilova et al. ("Analysis and Visualization of Relations in eLearning", Computational Social Network Analysis, Springer, London, 2010, pp. 291-318) (Year: 2010).*

Tane et al. ("Semantic Resource Management for the Web: an E-learning Application", WWW Alt. '04: Proceedings of the 13th international World Wide Web Conference on Alternate Track Papers and Posters, May 2004, pp. 1-10) (Year: 2004).*

Varlamis et al. ("Chapter 3: Application of Social Network Metrics to a Trust-Aware Collaborative Model for Generating Personalized User Recommendations", , Lecture Notes in Social Networks 6, Springer-Verlag Wien, 2013, pp. 49-74) (Year: 2013).*

International Search Report and Written Opinion from PCT/IB2016/055253 dated Oct. 27, 2016.

Ahmet Subaşi, an Ambient Semantic Intelligence Model for Scientific Research, a Thesis Submitted To the Graduate School of Informatics of Middle East Technical University, in Partial Fulfillment of the Requirements for the Degree of Doctor of Philosophy in the Department of Cognitive Science ,Feb. 2016 , http://etd.lib.metu.edu.tr/upload/12619757/index.pdf.

Ahmet Subaşi, A Dynamic Systems Theory of epistemic curiosity, New Ideas in Psychology ,Aug. 2019,pp. 8-14,vol. 54, https://www.sciencedirect.com/science/article/abs/pii/S0732118X18300394?dgcid=rss_sd_all.

Ahmet Subaşi,Psycho-Logical Account of Epistemic Curiosity,7th International Conference on Languages, Education, Humanities and Social Sciences (LEHSS-2018-DUBAI) Jan. 1-3, p. 113-115, 2018 Dubai (UAE).

Ahmet Subaşi,Cognitive dynamics of scientific curiosity,2009 https://cogsci.boun.edu.tr/content/cognitive-dynamics-scientific-curiosity.

\* cited by examiner

CURIOSITY ADAPTIVE AMBIENT SEMANTIC INTELLIGENCE SYSTEM AND METHOD FOR SCIENTIFIC COLLABORATION

RELATED APPLICATIONS

This application claims priority to U.S. Provisional Application Ser. No. 62/212,696, filed on Sep. 1, 2015, currently pending, the disclosure of which is hereby incorporated by reference in its entirety.

FIELD OF THE INVENTION

The present technology relates to generating and providing a curiosity-adaptive graph database of intellectual resources using an ambient semantic intelligence system, which may act as an intelligent and interactive scientific collaboration platform to aid scientific research.

BACKGROUND

Scientific curiosity is the key motivation behind most of the scientific and philosophical achievements of human kind. Paradoxically, the concept of scientific curiosity itself is one of the least studied subjects in the history of science and philosophy. Scientific curiosity can be defined as an intrinsically motivated desire to make sense of potentially everything that are proper subjects of science and philosophy. However, human beings are bound by time and human curiosity has to make selections among different items of information based on time constraint. If there are two intellectual resources such as two articles or books and a researcher has to pick one of them due to time constraint, the selection is guided by the cognitive dynamics of human curiosity. The selectivity property of human curiosity is driven by human personality. In an age of 'attention economy' the biggest problem is not the unavailability of information but its overabundance and the need for curiosity adaptive information-filtering systems becomes more conspicuous.

Ambient systems are highly adaptive, personalized and context-aware systems. Curiosity motivation, like other motivations, has a direction. When we are hungry, we orient toward food. When we desire knowledge, we orient toward specific items of information, i.e., make selections among items of information. This is called the selectivity property of curiosity. In the context of information retrieval systems, ambient technologies refer to the adaptivity of the system to the mental movements, i.e., selectivity patterns of the researcher, which enables context aware and personalized interactions.

The study on curiosity has also inspired computational work by highlighting the cognitive mechanisms that make possible our quest for the unknown. The question is how it is possible that we are seeking what we do not know. Some answers to these questions are related to specific aspects of linguistics and logic. Human beings are capable of referring to the unknown and logically formulating the representations of the unknown. Semantic intelligence enables machine-processable and interoperable formal representations of information that boosts the efficiency of collaboration and information sharing. With the use of rule-based semantic reasoners, formally represented intellectual resources in a graph database can also be processed for generating novel representations that are satisfying objects of human curiosity in a similar way that natural curiosity process works. Similarly, the construal of curiosity as a reference point phenomenon inspires new ways of designing information retrieval systems in which intellectual resources are represented, collaboratively accumulated, and made accessible in the form of curiosity attracting pointers of high significance that help a person to fill the gap between his current level of knowledge and his aspiration level.

SUMMARY OF THE INVENTION

The present technology provides curiosity-adaptive ambient semantic intelligence systems and methods for scientific collaboration. Ambient systems are highly adaptive, personalized and context-aware systems, whereas semantic intelligence has the capabilities of formally representing information, interoperability and rule-based reasoning. The present technology provides an ontology-driven graph database populated through user input with machine-processable semantic representations of intellectual resources in the form of Curiosity Attracting Pointers (CAPs). CAPs are like landmarks of an intellectual domain such as names of significant concepts, articles, books, contributors related to that domain rather than full descriptions of their content such as in online encyclopedias. They are like road signs for the drives of curiosity that lead us to satisfaction. The formal semantics of the system also enables the system to automatically add new resources into itself through reasoners. Users of the system score their CAP entries based on various parameters popularity, popular score given to CAP, the score given to CAP by a prestige group and the network centrality of the CAP. The weight of each parameter is defined by the user and the system also personalizes the weights by analyzing the user's selectivity patterns. Curiosity traits are also derived by the system through a theory based analysis of selectivity patterns of each user. User-scoring and curiosity value of resources are used by the system to determine an overall satisfaction value for each CAP, which enables the system to generate a personalized output graph. The system may also provide an interactive, context-aware, real-time and omnichannel online platform in the form of web pages, social media interfaces and word processor add-ons.

In one aspect, a curiosity-adaptive ambient semantic intelligence system for scientific collaboration is provided herein that includes a processor communicatively coupled to a memory device, a data receiving module, a graph database, a rule-based semantic reasoner, a curiosity satisfaction value calculating module, and a personalized output generation module. The data receiving module receives user input that includes at least one user selected field of interest and at least one curiosity trait, The graph database stores and maintains machine-processable semantic representations of components of a scientific ontology. The components of the scientific ontology include one or more fields of interest, including the user selected field of interest, and one or more Curiosity Attracting Pointers (CAPs), each CAP being associated with at least one field of interest. The components may also include one or more components selected from the group consisting of: relationships between CAPs (CAP-Rs), Curiosity Dynamics Metatags (CDMs); Supplementary Digital Links (SDLs), and Resource Identity Metatags (RIMs). The rule-based semantic reasoner automatically identifies one or more potentially relevant CAPs within the graph database and associates the one or more potentially relevant CAPs with the user selected field of interest in the graph database. The curiosity satisfaction value calculation module analyzes the at least one curiosity trait and assigns a personalized curiosity satisfaction value to each of the CAPs associated with the user selected field of interest in the graph database. The personalized output generation module generates a personalized output graph comprising a subset of CAPs from the graph database associated with the user selected field of interest. Each CAP in the subset is selected by the personalized output generation module based on its assigned personalized significance value.

In another aspect, a method of operating an ambient semantic intelligence system comprising a processor communicatively coupled to a memory device is provided. The method includes a step of receiving user input by a data receiving module of the system. The user input includes at least one user selected field of interest and at least one curiosity trait. The method also includes a step of storing in a graph database of the system machine-processable semantic representations of components of a scientific ontology. The components of the scientific ontology include one or more fields of interest and one or more Curiosity Attracting Pointers (CAPs), each CAP being associated with at least one field of interest. The method further includes a step of automatically identifying using a semantic rule based reasoner one or more potentially relevant CAPs within the graph database and associating the one or more potentially relevant CAPs with the user selected field of interest in the graph database. The method also includes a step of analyzing the at least one curiosity trait using a curiosity satisfaction value calculation module and assigning a personalized overall significance value to each of the CAPs associated with the user selected field of interest in the graph database. The method also includes a step of generating a personalized output graph using a personalized output generation module of the system. The personalized output graph includes a subset of CAPs from the graph database associated with the user selected field of interest. Each CAP in the subset being selected by the personalized output generation module based on its assigned personalized significance value.

In some examples, an article of manufacture comprising a non-transitory computer readable storage medium can be provided that comprises computer readable instructions tangibly embodied thereon which, when executed by a processor of an ambient semantic intelligence system comprising the processor communicatively coupled to a memory device, cause a computer to carry out the method described above.

BRIEF DESCRIPTION OF THE DRAWINGS

Specific examples have been chosen for purposes of illustration and description, and are shown in the accompanying drawings, forming a part of the specification.

Elements of the figures that remain the same between figures have the same reference number.

DETAILED DESCRIPTION

Figure 1:
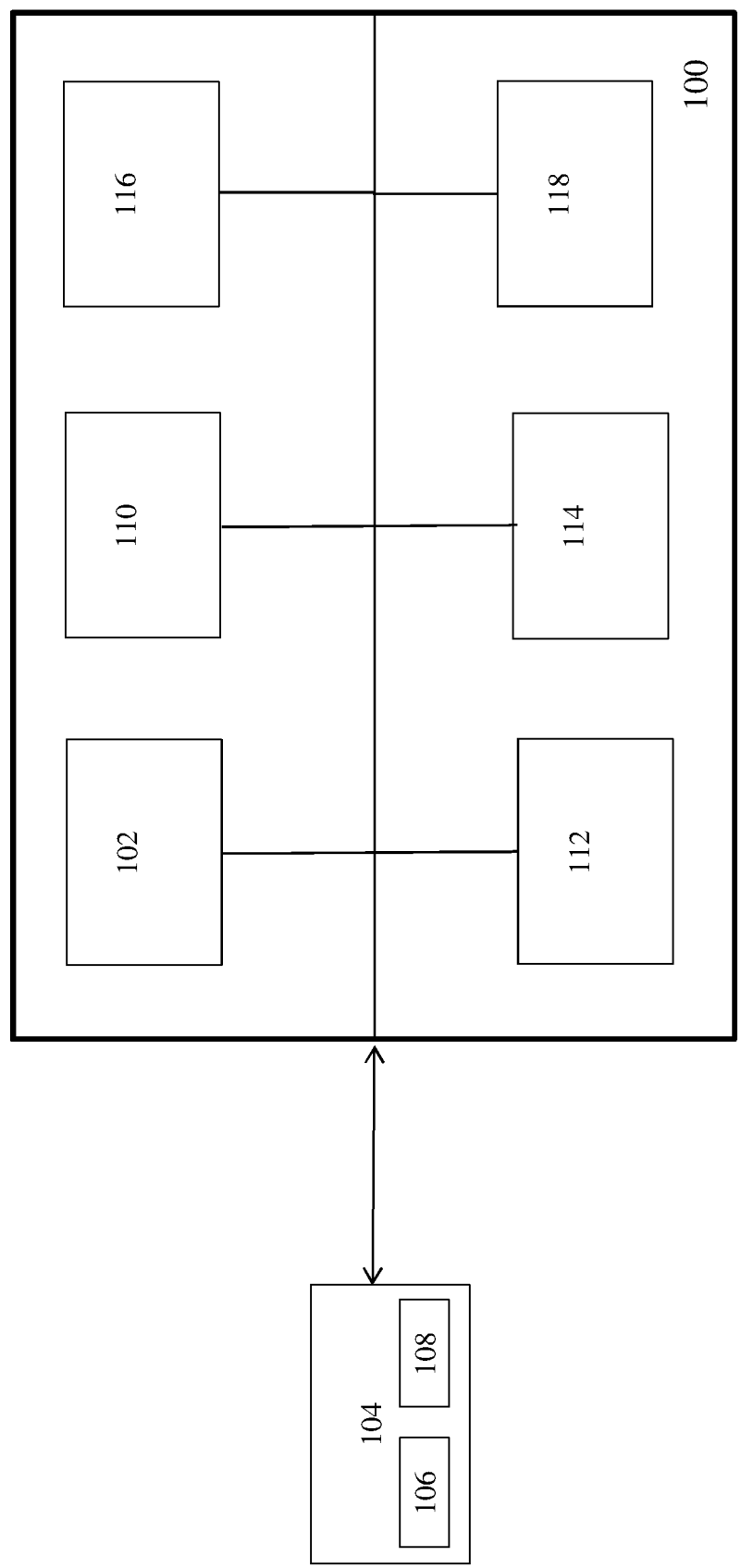
FIG. 1 is a block diagram of one example of a curiosity-adaptive ambient semantic intelligence system of the present technology.

Curiosity-adaptive ambient semantic intelligence systems and methods of the present technology relate to providing an interactive scientific collaboration platform to aid research process. In at least some embodiments, systems of present technology may:

- Provide a scientific ontology of scientific and philosophical subjects in the form of graph database.
- Enable collaborative generation of intellectual resources in the form of Curiosity Attracting Pointers relating to the components of scientific ontology utilizing machine processable semantic descriptions (semantic intelligence aspect).
- Enrich the graph database with additional information defined within the overall model such as Curiosity Attracting Pointer Relationships (CAP-Rs), Curiosity Dynamics Metatags (CDMs), Supplementary Digital Links (SDLs), and Resource Identity Metatags (RIMs).
- Generate inputs via supervisors and users as well as automated methods such as crawling available online resources and formalizing them according to the model.
- Automatically augment the shared intellectual resources by the application of rule-based semantic reasoners, logic operations, Natural Language Processing and machine learning methods (semantic intelligence aspect).
- Analyze and model personal curiosity traits of users based on selectivity patters of users, user scoring of intellectual resources and profiling preferences, which, in turn, enables Curiosity Satisfaction Value calculation for each resource (ambient intelligence aspect).
- Personalize and optimize the retrieval of intellectual resources through a ranking method based on Curiosity Satisfaction Value calculation of each intellectual resource (ambient intelligence aspect).
- Enable omnichannel user interaction with the system through web pages, social media and word processor add-ons.
- Enable effective collaboration and communication among users in the form of a rich social media platform.

Curiosity-adaptive ambient semantic intelligence systems and methods of the present technology generally provide users with intellectual resources in the form of Curiosity Attracting Pointers (CAPs) of significance to the user's chosen field of interest. CAPs are curiosity instigating road signs that serve as a roadmap to a full cognitive journey. To use the analogy of tourism, the 'name' of an attraction point such as a famous museum may be a CAP. Similarly, a famous artwork that a museum or a city is identified with, such as the 'Mona Lisa,' may be a CAP, but a less significant artwork which does not have the power to represent a landmark for an attraction point may not be. CAPs of an intellectual journey driven by curiosity are intellectual landmarks, such as the names of the pioneering contributors to the field, the names of the basic concepts, the list of seminal articles and foundational ideas. The full definition of basic concepts, the content of the seminal books, the life story of pioneering contributors, the detailed description of the foundational ideas are not part of the CAPs, but instead are the content of what CAPs 'point to'. Some examples of CAPs may include:

The name of a concept or a subject or a domain or a field.
A formal description of a succinct statement.
The title of an article or a book.
A link to a digital resource.
The name of a contributor.

CAPs may be presented in the form of a machine processable semantic description. CAPSs are generally strictly controlled and constrained at the point of data entry in terms of their validity, cleanness and format. Each CAP entered into the system is systematically linked to the components of a dynamic scientific ontology. In some examples, scientific ontology may be designed and transformed dynamically by the system supervisors. Users, however, may give feedback, make recommendations and make change requests collaboratively.

A curiosity-adaptive ambient semantic intelligence system of the present technology may be computer implemented systems accessible by one or more users through various operating channels, such as wired or wireless networks, Internet web pages, social media, word processors, and content management systems.

FIG. 1 is a block diagram illustrating one example of a curiosity-adaptive ambient semantic intelligence system 100 of the present technology. System 100 includes a data receiving module 102 configured to receive user inputs from at least one user device 104 operably connected to the system 100. The user device may include at least one graphical user interface 106, and one or more user input devices 108. A user input device may be any suitable device through which the user may input information, including for example: a touch input device such as a keyboard, mouse, pen, trackball, touch screen, or controller; a voice input device; a scanning device; a digital camera; or other such input devices. System 100 also includes a graph database 110, which comprises dynamic scientific ontologies and their components, including fields of interest, Curiosity Attracting Pointers (CAPs), user-defined relationships between CAPs (CAP-Rs); Curiosity Dynamics Metatags (CDMs) that carry information about the curiosity instigating properties of CAPs; Supplementary Digital Links (SDLs) that connect CAPs with digital resources; and Resource Identity Metatags that carry information about the identity and properties of CAPs and SDLs. System 100 also includes a rule-based semantic reasoner 112 that automatically identifies one or more potentially relevant CAPs within the graph database based on CAPs, CAP-Rs and RIMs existing in the system, and associates the one or more potentially relevant CAPs with the user selected field of interest in the graph database 110. System 100 further includes a curiosity satisfaction value calculating module 114 that analyzes curiosity traits of users and assigns personalized curiosity satisfaction values to each CAP in the graph database 110 associated with the user selected field of interest. System 100 also includes a personalized output generation module 116 that generates one or more personalized output graphs, which may include one or more graphic displays accessible by a user through the user device 104. Each personalized output graph includes a subset of components from the graph database 110 associated with the user selected field of interest. The subset of components that are included in the personalized output graph are selected by the system based on the personalized curiosity satisfaction values assigned to CAPs by the curiosity trait modeling module 114.

In one example of a curiosity-adaptive ambient semantic intelligence system 100, the system may also include an online data acquisition module 118. The online data acquisition module 118 may crawl the internet, pull data from relevant online resources, parse the pulled data and format it into components suitable for populating the scientific ontology stored in the graph database 100. The online data acquisition module 118 may also automatically populate the formatted components into the scientific ontology. The initial scientific ontology stored in the graph database 110 may be made up of components entered by system admins and components generated by the online data acquisition module 118.

Figure 2:
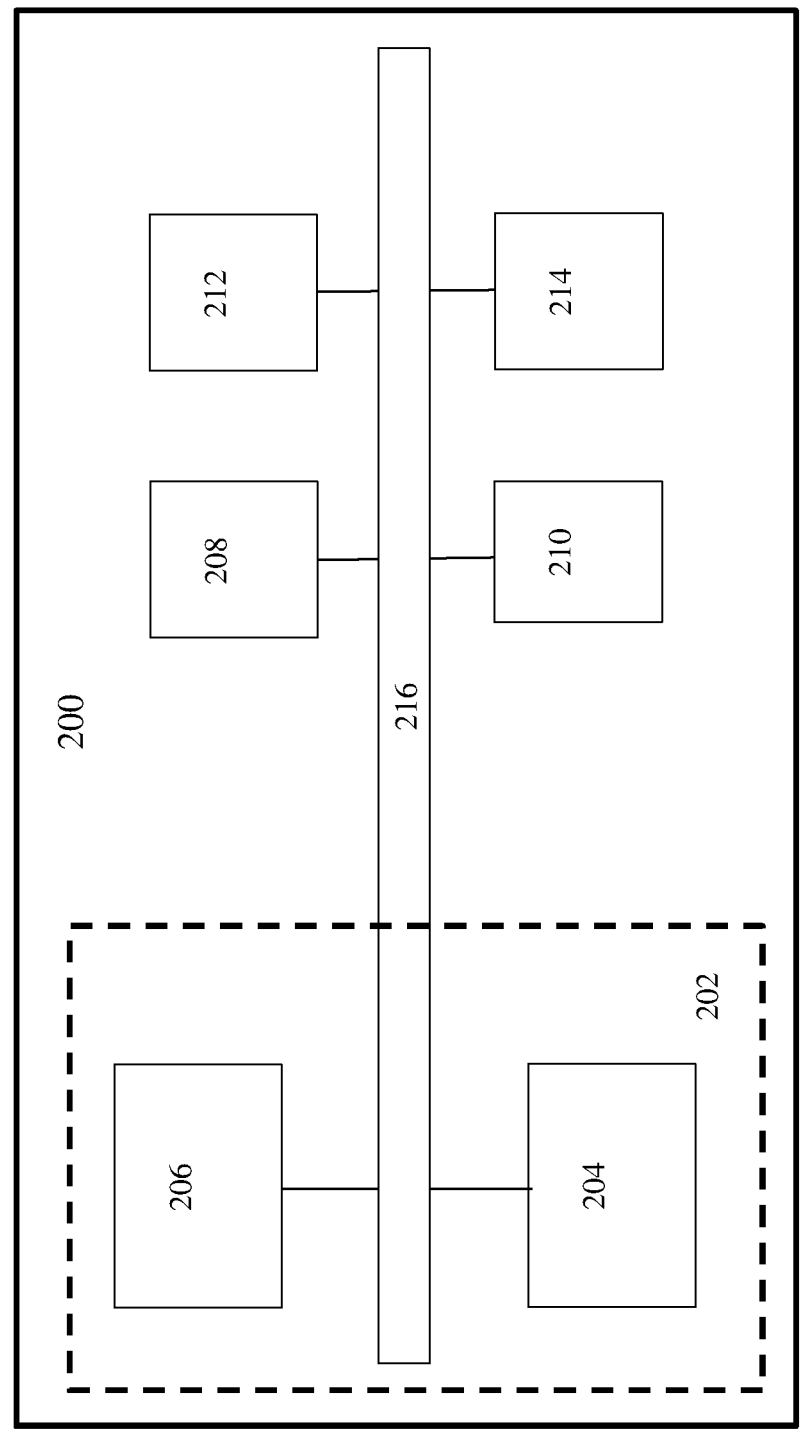
FIG. 2 is a block diagram of a computing environment that may be used to implement a system of FIG. 1.

FIG. 2 illustrates a generalized example of a computing environment 200 that can be used for implementing curiosity-adaptive ambient semantic intelligence systems of the present technology. The computing environment 200 includes a most basic configuration 202 (indicated by a dashed line) that includes at least one processing unit 204 and memory 206. The modules of FIG. 1 may be in the form of computer-executable instructions that may be stored in the memory 206. The processing unit 204 is operatively coupled to the memory 206 and may be configured to implement the modules by executing the computer-executable instructions. The processing unit 204 may be a real or a virtual processor. The memory 206 may be volatile memory (e.g., registers, cache, RAM), non-volatile memory (e.g., ROM, EEPROM, flash memory, etc.), or any combination of the two.

As shown in FIG. 2, the computing environment 200 may have additional components. For example, the computing environment 200 includes storage 208, one or more input devices 210, one or more output devices 212, and one or more communication connections 214. The storage 208 may be removable or non-removable, and may include one or more magnetic disks, magnetic tapes or cassettes, CD-ROMs, CD-RWs, DVDs, or any other medium which may be used to store information and which may be accessed within the computing environment 200. The one or more input devices 210 may be: a touch input device such as a keyboard, mouse, pen, trackball, touch screen, or controller; a voice input device; a scanning device; a digital camera; or another device that provides input to the computing environment 200. The one or more output devices 212 may be a display, printer, speaker, or another device that provides output from the computing environment 200. The one or more communication connections 214 may be used to operatively connect the computing environment 200 with another computing entity, such as user device 104. Communication connections 214 may convey information such as computer-executable instructions, audio or video information, or other data in a modulated data signal. A modulated data signal is a signal that has one or more of its characteristics set or changed in such a manner as to encode information in the signal. In one example, communication connections include wired or wireless connections implemented with an electrical, optical, RF, infrared, acoustic, or other carrier mediums. An interconnection mechanism 216, such as a bus, controller, or network, may interconnect the components of the computing environment 200. Operating system software (which may be stored on memory 206 and/or storage 208) may provide an operating environment for other software executing in the computing environment 200, and coordinates activities of the components of the computing environment 200.

Referring back to FIG. 1, a user can access the curiosity-adaptive ambient semantic intelligence system 100 through the user device 104, and can initiate use of the system 100 by providing user inputs. In one example, the user can access the system 100 through one or more web pages, and can provide the user inputs through a profiling and data entry form. The user inputs may include one or more personal curiosity traits such as: selection of at least one field of interest; identifying CAPs of interest by making a search within the available graph database with self-defined criteria and selecting and scoring the retrieved CAPs; self-assigned weight values to parameters such as popularity, popular score, prestige score and centrality; selection of a limitation on the number of intellectual resources to be retrieved; providing definitions of peer, collaboration and prestige groups; providing definitions of the access location of folders or reference management system accounts with resources to be automatically analyzed by the system for initial profiling. The user inputs are received by the receiving module 102, and the system may generate an initial output graph of intellectual resources adapted to the initial profiling information available to the system showing CAPs relating to the user's selected field of interest.

Figure 3:
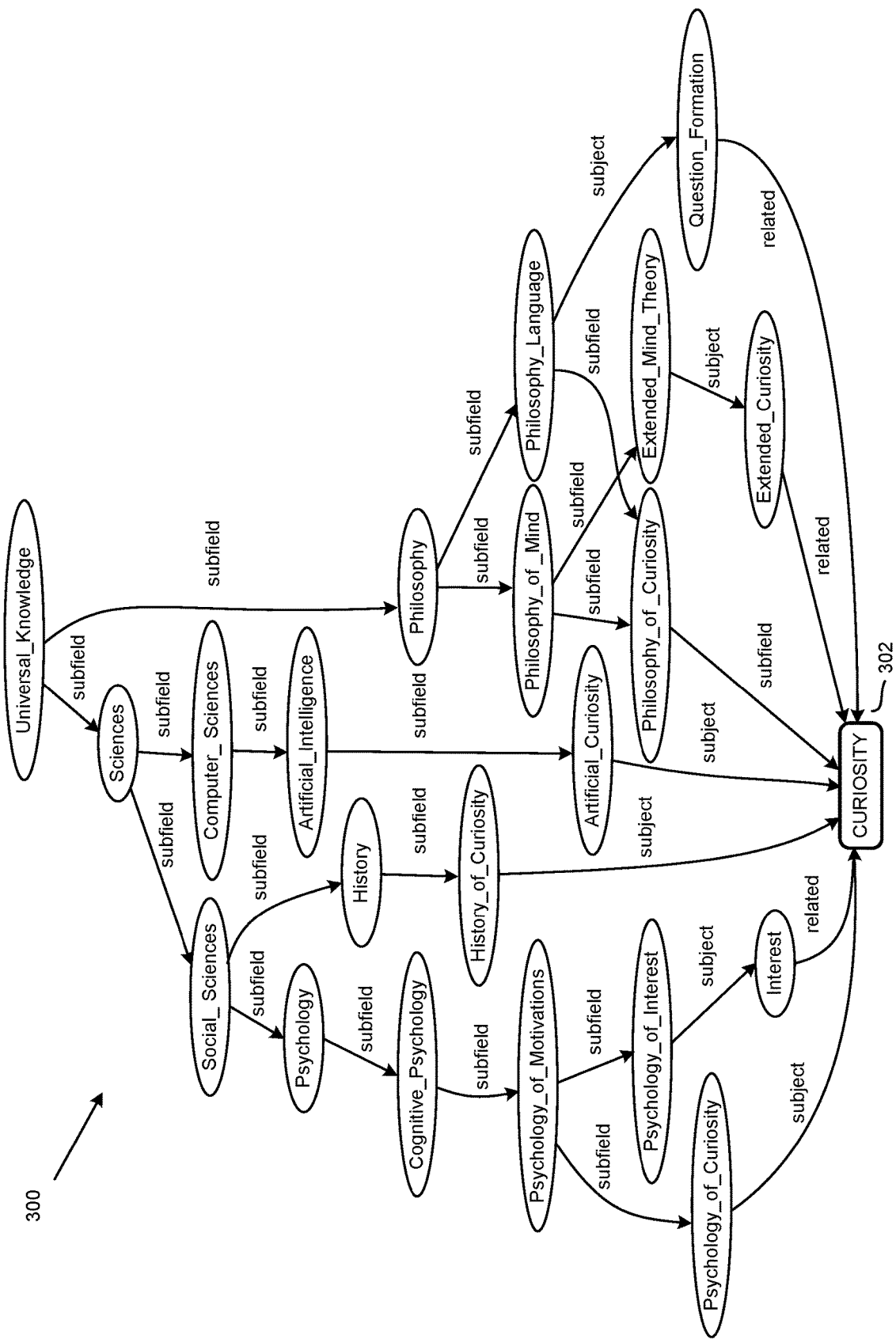
FIG. 3 illustrates a scientific ontology graph relating to the field of interest "Curiosity."

FIG. 3 illustrates a scientific ontology graph 300 showing fields of interest, including field of interest 302, which is labeled as being "Curiosity." The ontology graph 300 may be part of the skeleton of the informational structure within the graph database 110.

Figure 4:
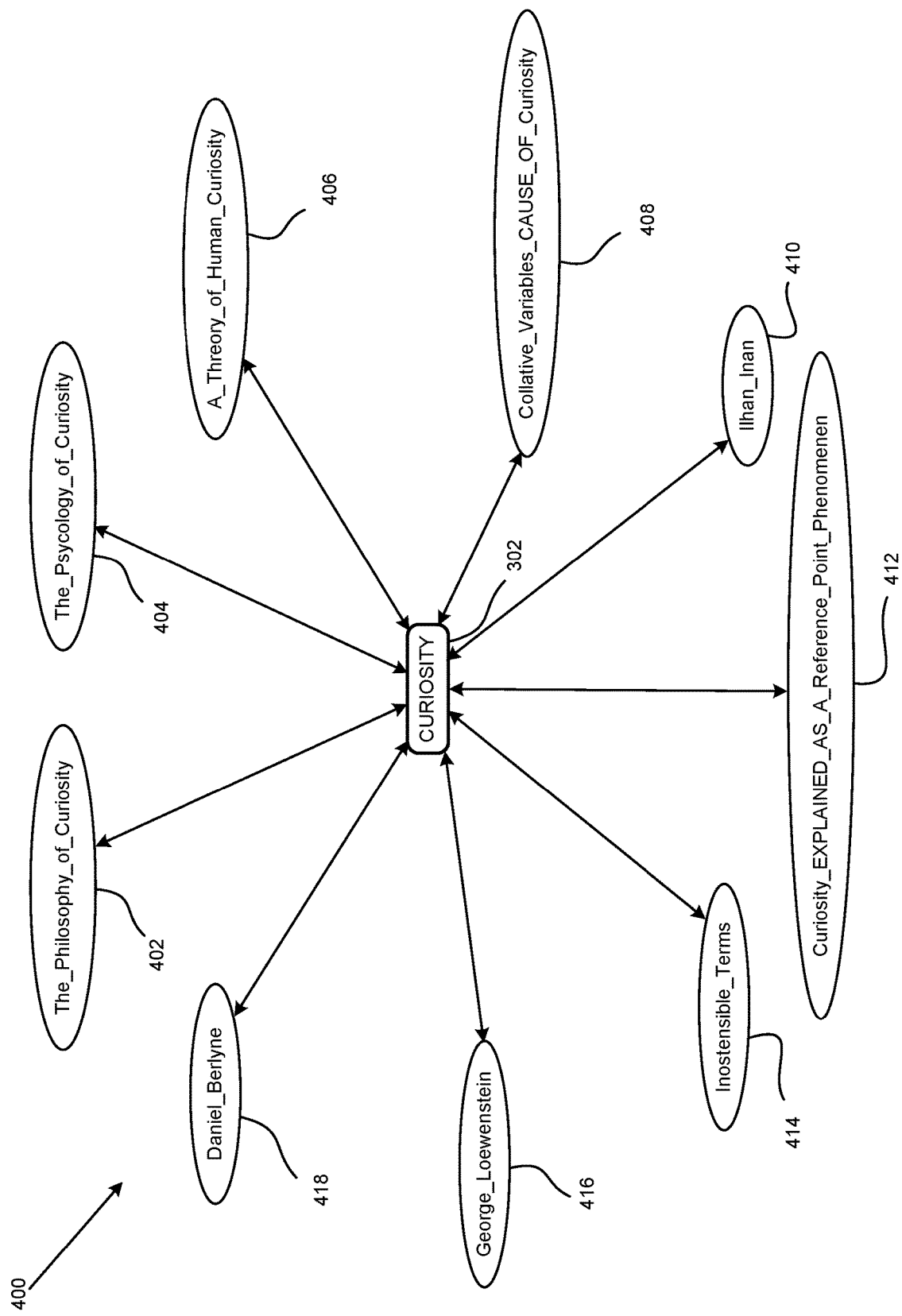
FIG. 4 illustrates a graph of Curiosity Attracting Pointers (CAPs) relating to the field of interest "Curiosity."

FIG. 4 illustrates one example of a personalized output graph 400 of the type that may be generated by a system of the present technology for a user that has selected the field of interest 302 "Curiosity" of FIG. 3. As shown in FIG. 4, the field of interest 302 is "CURIOSITY," and CAPs 402-418 are linked to the field of interest. In this example, the number of CAPs shown has been limited to nine, but in other examples it should be understood that any number of relevant CAPs could be included, and that a limitation on the number of CAPs may be input by the user. If the user is, for example, a PhD student who decides to study the field of "Curiosity" for his dissertation, a sufficiently populated graph may be capable of efficiently providing the student with a list of seminal articles, best-selling books and basic concepts related to the research area. With the mechanisms described herein, the system adapts effectively to the requirements of the user and his curiosity traits for optimizing the resources to be retrieved.

Figure 5:
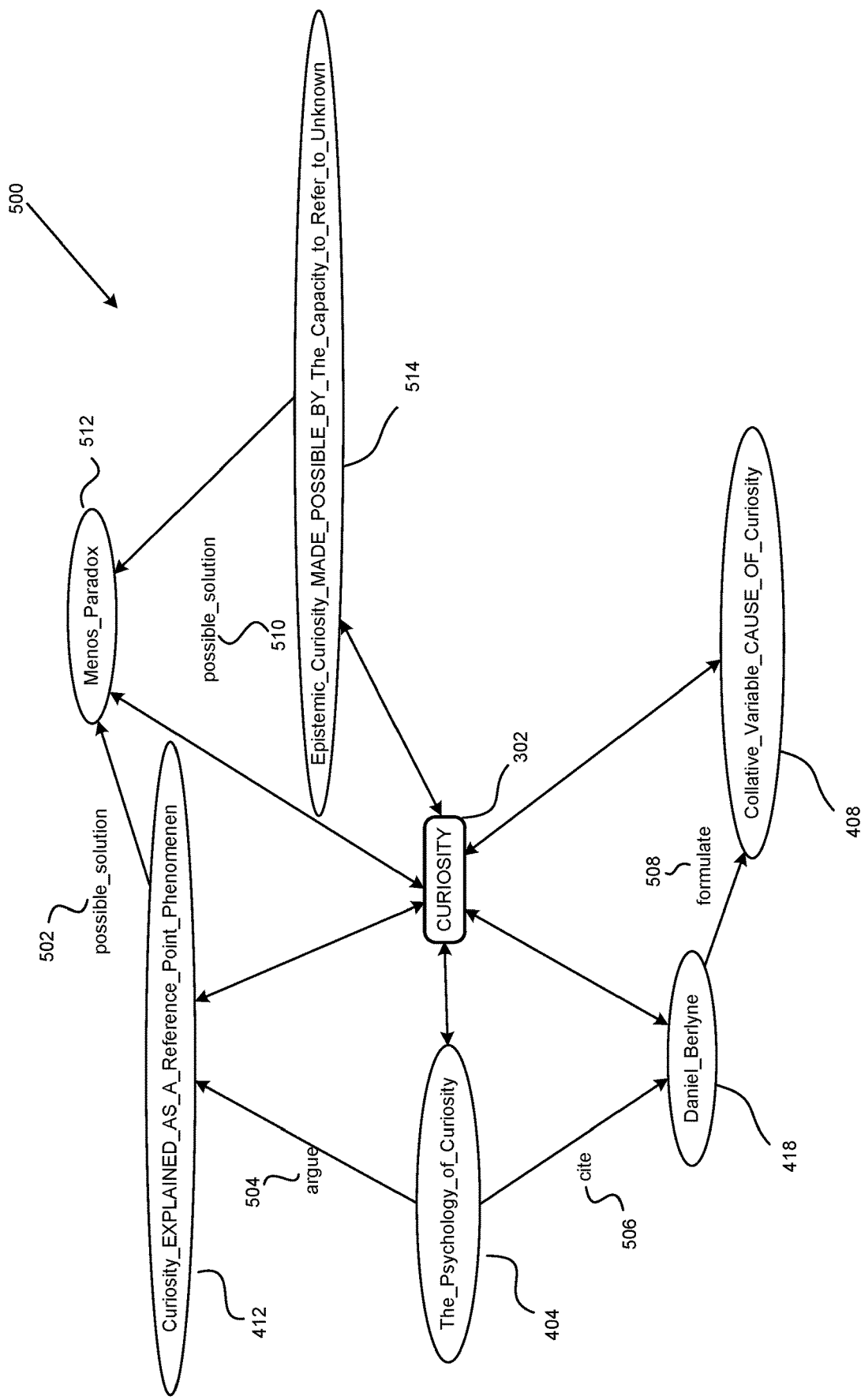
FIG. 5 illustrates a graph of Curiosity Attracting Pointer Relationships (CAP-Rs) associated with certain CAPs of FIG. 4.

Underlying the personal output graph of FIG. 4, the graph database 110 of the system may also include Curiosity Attracting Pointer Relationships (CAP-Rs), which are relationships between the CAPs. FIG. 5 illustrates one example of a graph 500 of Curiosity Attracting Pointer Relationships (CAP-Rs) 502-510, which are associated with a certain CAPs of FIG. 4. As shown in FIG. 5, CAPs 512 and 514 are also linked to CAP 502 and the field of interest 302. However, CAPs 512 and 514 may not appear on the personal output graph 400 based on the selection factors utilized by the system as described herein, including for example that the personalized curiosity satisfaction value assigned to each of those CAPs may be beneath a threshold value for inclusion. All scoring, weights and values may be presented to the user in the graphic displays output by the system. The user may influence the automated satisfaction calculations by manually entering one or more of the weights and values for all types of available parameters. The user can also configure the system to display full graph output regardless of the ranking or define a limitation on the total number of CAPs to be covered by the graph.

As discussed above, each CAP in the graph database 110 is designed to be a pointer, rather than itself providing detailed content. More detailed content information, in the form of Supplementary Digital Links (SDLs), can be associated with any CAP. Information generally considered to be appropriate for an SDL includes links to online encyclopedia or wiki entries, digitally available articles, PDFs, books and blogs. For example, a CAP such as 'The Psychology of Curiosity' simply says that this article is a seminal article for the subject of Curiosity. However, the SDL of this CAP leads the user to the PDF of that article and the user can start reading its content online. An association between a CAP and an SDL may be in the form of clickable link, or any other tool that directs a user from the CAP to the SDL. For example, if a user were to click on the CAP 416 labeled "George_Lowenstein" in FIG. 4, the system may provide the user with an SDL graph 600 of FIG. 6, which includes links to web pages, Wikipedia entries and YouTube videos.

Figure 6:
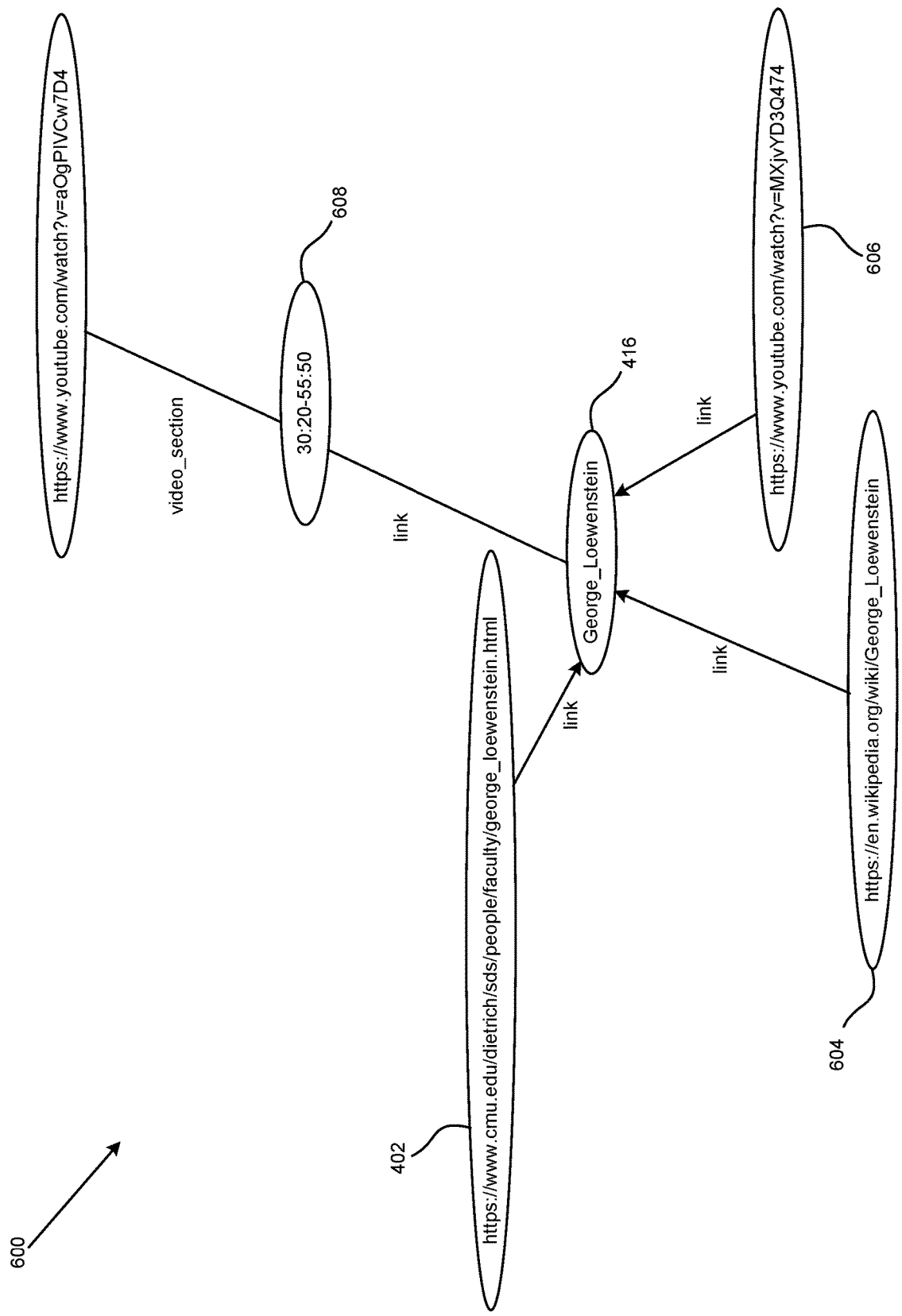
FIG. 6 illustrates a graph of Supplementary Digital Links associated with a CAP of FIG. 4.

As shown, FIG. 6 illustrates an SDL graph 600 associated with the CAP 416 labeled "George_Lowenstein." The SDL graph 400 shows SDLs 602-608. The first SDL 602 is a link to a faculty web page for George Lowenstein. The second SDL 604 is a link to a write-up about George Lowenstein in an online encyclopedia. The third SDL 606 is a link to a video. The fourth SDL 608 is a link to a section of a video.

CAPs and SDLs may be entered into the system by a user or a system admin together with their Resource Identity Metatags (RIMs). RIMs are stored and maintained in the graph database 110 as ontology components. With respect to determining metatags, one example is that if the title of a book is a CAP, its author, ISBN, publisher and publishing year may be RIMs. In another example, if the title of an article is a CAP, the name of the journal in which it is published, its author and its number of pages may be RIMs. In yet another example, if an article is related to a research area, the title of the article may be used as a CAP, rather than the name of the journal in which the article is published. The name of the journal may be entered as an RIM. RIMs are generally not displayed to a user as part of a CAP graph, except for the RIMs which are also CAPs. Similarly, RIMs are generally not displayed to a user as part of an SDL graph, except for the RIMs which are also CAPs or SDLs. However, in at least some examples, a user can access RIM graphs.

Figure 7:
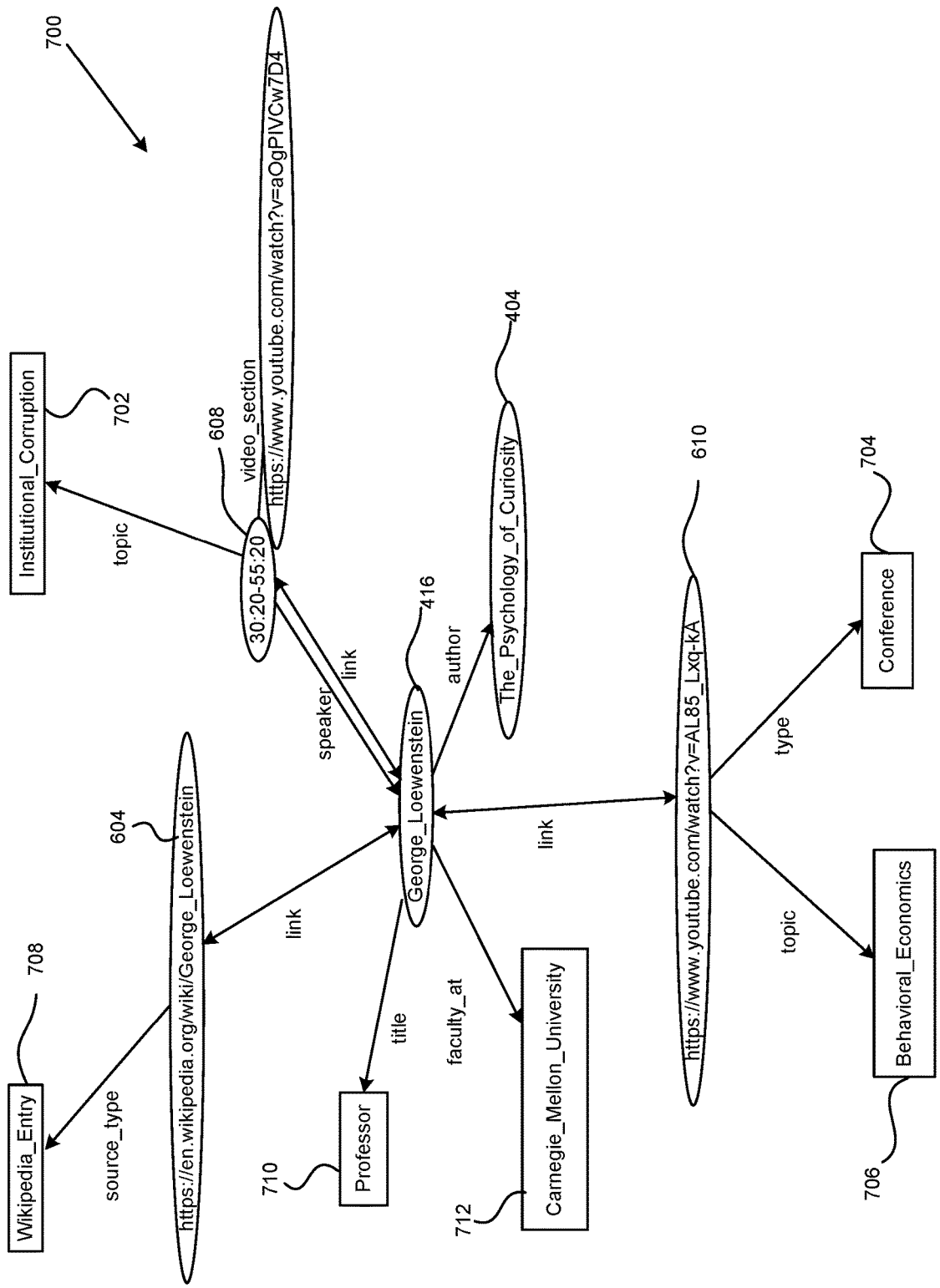
FIG. 7 illustrates a graph of Resource Identity Metatags associated with the CAP and SDLs from FIG. 6.

FIG. 7 illustrates one example of a RIM graph 700, which includes RIMs associated with the SDLs of FIG. 6. As shown, for SDL 608, which is a section of a video, the RIM 702 is provided that states the topic of the video. For SDL 610, there are associated RIMs of both type 704 ("Conference") and topic 706 ("Behavioural_Economics"). For SDL 604 the RIM 708 states the source type of the web page link. There are also RIMs directly relating to the CAP 416 ("George_Loewenstein"). RIM 710 is the title of the CAP 416 and RIM 712 states the university at which the CAP 416 is faculty (Carnegie_Mellon_University).

In operation, the personalized output generation module 116 of a system of the present technology ranks and selects CAPs to be included in a personalized user output graph based on the Curiosity Satisfaction Value (CSV) assigned to each CAP by the CSV calculation module 114. The components of CSV are Objective Value (OV) and Curiosity Dynamics Value (CDV).

The Objective Value is a weighted sum of various parameters some of which may be:
 The frequency of the entry of a specific resource (popularity).
 The amount of other graph items that are linked to a specific resource (centrality).
 The average subjective significance score given by the users to their entries (popular score).

The average score given to a resource by a group of user-defined or system-defined prestige group (such as famous scholars of a field).

The weights of the parameters are assigned by the CSV calculation module 114 based on the personal curiosity traits of the relevant user. For example, some users may not be interested in the popularity of an entry while they may be interested in entries which are scored highly by a prestige group (the group being defined either by the user or the system).

CSV calculation module 114 does not solely depend on the Objective Value. A Curiosity Dynamics Value (CDV) is also calculated for each CAP based on a model derived from the assumptions of a unified cognitive theory of human curiosity. The basic assumptions of the theory are as follows:

1. Scientific curiosity is an intrinsic motivation to make sense of potentially everything that are the proper subjects of science and philosophy (universal curiosity assumption).
2. Due to time constraints, universal curiosity selects certain intellectual resources over others (selectivity assumption).
3. Selections of universal curiosity are optimized if and only if the overall satisfaction coming from the selection of intellectual resources is maximized (optimization assumption).
4. To analyze and model patterns of selectivity, a model of curiosity is required.
5. Cognitive dynamics that influence curiosity traits of a person can be analyzed as such:
    a. Interest vs. serendipity dynamics;
        i. Interests are defined by psychological and sociocultural parameters. Some people are interested in mathematics, some are interested in arts. Interest is an overaching dynamics of curiosity. However, there are cases where human curiosity (universal curiosity) escapes from the influence of interests (serendipity). There is always an appetite for pieces of information that are irrelevant to the interest domains. Interestingness is also influenced by the social value attributed to a piece of information. This aspect is related to the Objective Value, which is a weighted average of several parameters such as popularity, popular score, prestige and centrality. These parameters are also modified based on the personality.
    b. Novelty vs familiarity dynamics;
        i. Curiosity tends to expand toward new items of information. Novelty instigates curiosity. Too much novelty and surprise can also have an aversive effect. Some people prefer to deal with familiar domains of information.
    c. Challenge-seeking vs. challenge-avoiding dynamics;
        i. Items of information that are incongruous with one's current state of knowledge instigates curiosity. Some types of information might pose challenges to what is known within the current state of mind Some people have the inclination to cope with challenges to master or minimize conflicts. Inconsistencies, contradicting ideas, recalcitrant data, paradigm shifting ideas, challenges to an intellectual authority, paradoxes, unsolved mysteries, difficult problems, counter arguments, unexplained facts and similar types of information has the power to attract great deals of attention among intellectuals and curious spirits. Some people, on the other hand, avoid any type of mental challenge that induce stress.
    d. Completion vs. sketching dynamics;
        i. Information gaps within a knowledge domain instigate curiosity. Completing a knowledge domain has a motivational appeal just like completing a puzzle. Completion is a subjective matter. The perception of completeness might remove the appetite to complete more. Therefore, some people are satisfied with sketches of a knowledge domain, while some are obsessive about completing it to the last piece of the puzzle.
    e. Explanation vs. description dynamics;
        i. Items of information that have the power to explain facts and phenomena such as laws of nature, formulas, principles and axioms instigate curiosity. Similarly core pieces of information have greater appeal than peripheral pieces of information. Some people, however, are more satisfied with facts and description of phenomenon rather than their core principles and explanations.
    f. Specialization vs. generalization dynamics:
        i. Some people are more satisfied by being a specialist with full focus on specific domains. However, some people are more interested in holistic views, interdisciplinary endeavors and being polimaths.
6. Cognitive dynamics of curiosity depicted above are analytical components that are utilized to characterize curiosity traits driven by human personality. For example challenging ideas might be aversive for one person while they might be very appetitive for another. Some people are generalists and they love exploring new domains while some are specialists and they love completing their knowledge about their specific domains of interest without expanding to new realms. In a sense cognitive dynamics of curiosity is like a vector space of individual dynamics all of which determine the final curiosity behavior. Some dynamics compete with each other while some others cooperate. The levels of competition and cooperation are also related to the personality.
7. Selection and scoring of CAPs by the user are used by the system for analyzing the selectivity patterns of the user, which in turn are analyzed to create as a curiosity trait model for the user. Some of the initial curiosity traits are configured through the initial user profiling form filled by the system user. Some examples of the operational rules derived from the theory to model curiosity traits of users are as follows:

Novelty Dynamics Formula-1: All the rest being the same about resources A and B, if A varies from what one already knows more than B and if A is consistently preferred over B by the user, then Novelty Dynamics is dominant in the curiosity trait model of the user.

Novelty Dynamics Formula-2: All the rest begin the same about resources A, B and C, if one has no prior information related to A, B and C and if one has to pick two of them due to time constraint, if A and B is close to each other in terms of content and C has the highest variation and A and C is consistently preferred to A and B and B and C is preferred to B and A, then Novelty Dynamics is dominant in the curiosity trait model of the user.

Completion Dynamics Formula: All the rest being the same about resources A and B, if A completes a closed interest domain, while B does not and if A is consistently preferred over B, then Completion Dynamics is dominant in the curiosity trait model of the user.

Explanation Dynamics Formula-1: All the rest being the same about resources A and B, if A completes an interest domain at the core, while B does it at the periphery and if A is consistently preferred over B, then Explanation Dynamics is dominant in the curiosity trait model of the user.

Explanation Dynamics Formula-2: All the rest being the same about resources A and B, if A completes an interest domain at the core with greater effect than B and if A is consistently preferred over B, then Explanation Dynamics is dominant in the curiosity trait model of the user.

Challenge-seeking Dynamics Formula-1: All the rest being the same about resources A and B, if A pose challenges to the components of an interest domain, while B des not and if A is consistently preferred over B, then Challenge-seeking Dynamics is dominant in the curiosity trait model of the user.

Interest Dynamics Formula: All the rest being the same about resources A and B, if A is under the interest domain of user, while B is not and if A is consistently preferred over B, then Interest Dynamics is dominant in the curiosity trait model of the user.

Curiosity instigating properties of CAPs may be analyzed by the CSV calculation module 114 through different methods, including the analysis of selectivity patterns of the user (is the user selecting and highly scoring resources from the same domain or is he making cross domain selections?; is the user always highly scoring the central elements of the interest domain network?; is the user favoring serendipitous recommendations?; etc.). The CSV calculation module 114 may also use Curiosity Dynamics Metatags (CDMs) for the modeling of certain curiosity traits. For example, for a user with higher appetite for mental challenges (challenge-seeking dynamics), a CAP with a CDM such as "paradox" or "paradigm-shifting idea" would have a higher Curiosity Dynamics Value. If the user consistently selects CAPs with challenge-seeking CDMs, this selectivity pattern is interpreted in terms of the higher influence of particular curiosity dynamics, which, in turn, defines the curiosity trait model.

Figure 8:
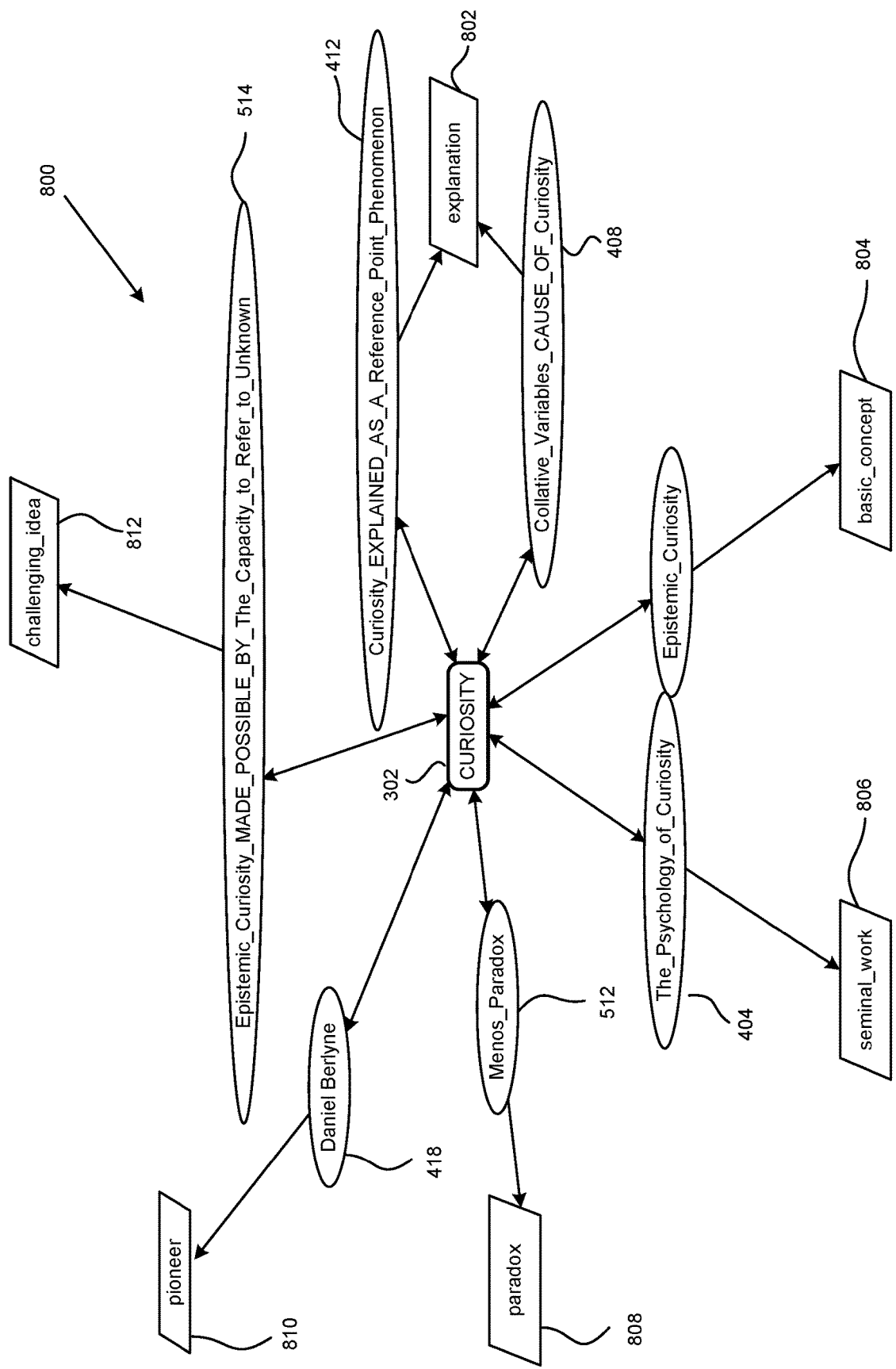
FIG. 8 illustrates a graph of Cognitive Dynamics Metatags (CDMs) associated with the CAPs of FIG. 5.

A sample CDM graph 800 and a simplified representation of its semantic description is shown in FIG. 8. The system assigns adjusted Curiosity Dynamics Values to each CAP based on the personalized curiosity trait model depicted here. As shown, CDMs 802-812 are associated with CAPs 404, 408, 412, 418, 512 and 514 related to the field of interest 302 "Curiosity."

There may be different mathematical models that may be used for Curiosity Satisfaction Value calculation, components of which are Objective Value and Curiosity Dynamics Value. The models may incorporate elements from utility maximization function, parallel distributed processing learning models, recommender systems and machine learning.

The system may store CAPs in the form of machine processable semantic descriptions. A sample of sematic description may be as follows;

Curiosity_EXPLAINED_AS_A_Reference_Point_Phenomenon->CURIOSITY
[label="Curiosity_Attracting_Pointer"];
This formal semantic description has the form of a simple triple having an object "Curiosity_EXPLAINE-D_AS_A_Reference_Point_Phenomenon"; a predicate "Curiosity_Attracting_Pointer"; and a subject "CURIOSITY."

As the object is a statement in itself, it can also be formally represented in the form of a triple: Curiosity->A_Reference_Point_Phenomenon [label="EXPLAINED_AS"];

Formal semantic descriptions enable interoperability with other graph components as well as the application of reasoning techniques.

Using this semantic intelligence feature, CAPs for use in a user output graph can be automatically identified by one or more rule based semantic reasoners 112 of the system 100. For example, a user might provide the field of interest "LINGUISTICS" as a user input, but not the field of interest "CURIOSITY." For example, the user might not have a clue about how those two fields of interest are related. However, the rule based semantic reasoner 112 can apply one or more logical rules to identify one or more CAPs associated with "CURIOSITY" in the graph database 110 and associate them with the user's field of interest "LINGUISTICS." One such logical rule may be as follows;

If a user is interested in domain A and if there is a CAP B in Domain B which potentially explains a significant phenomenon in domain A, then the user might also be interested in CAP B and CAP B is related to Domain A.

A more formal description of the resources and the application of a Resource Augmentation Rule (RAR) within the system may be as follows:

1. IF USER_A->DOMAIN_A [label="interested_in"];
2. IF PHENOMENON_A->DOMAIN_A [label="associated_with"]
3. IF CAP_B->PHENOMENON_A [label="EXPLAIN"];
4. IF CAP_B->DOMAIN_B [label="associated_with"];
5. THEN USER_A->CAP_B [label="interested_in"];
6. THEN CAP_B->DOMAIN_A [laber="related_to"];

In this example CAP B is identified and added to DOMAIN_A by the semantic reasoner 112.

Such rules can also be applied by the semantic reasoner 112 for deriving CDMs for CAPs. For example, if a statement associated with a field of interest is formally described and if it has the predicate label such as "EXPLAIN" or "CAUSE_OF" relating to "Explanation Dynamics" then the rule based reasoner 112 can automatically apply a Curiosity Dynamics Metatag (CDM) as "Explanation."

Other samples of Resource Augmentation Rules (RARs) in line with the theory and model, which may be applied by the semantic reasoner 112, may be:

If A is curious about any CAP_A, then A is likely to be curious about other CAPs that CAP_A is related to.

If A is curious about Contributor A, then A is likely to be curious about the contributions of A.

Figure 9:
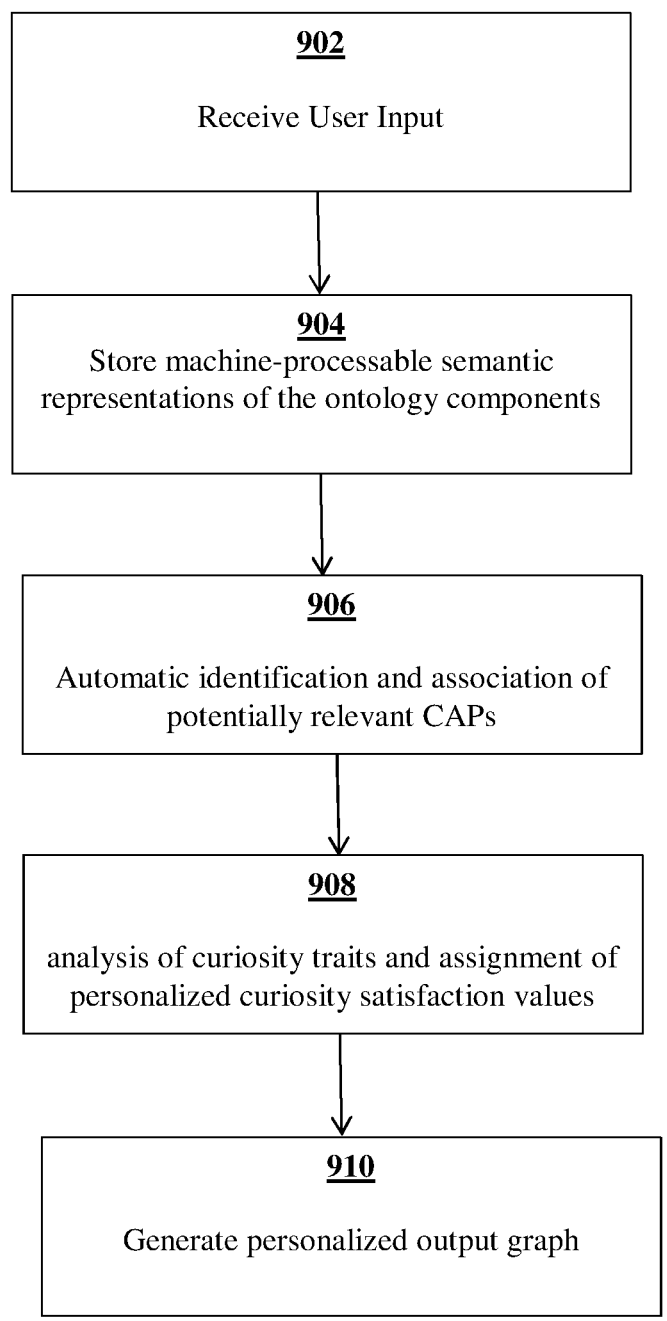
FIG. 9 is a flow chart of one method of operating a system of FIG. 1.

FIG. 9 is a flow chart illustrating one method of operating a curiosity-adaptive ambient semantic intelligence system of the present technology. Method 900 starts at data receiving step 902, where a data receiving module of the system receives user input. As discussed above, the user input can include any number of personal curiosity traits, but should at least include a field of interest. The method also includes step 904, in which a graph database of the system stores machine-processable semantic representations of the components of a scientific ontology. The method also includes step 906, at which one or more potentially relevant CAPs within the graph database are identified and associated the one or more potentially relevant CAPs with the user selected field of interest in the graph database. The automatic identification and association of step 906 may be performed by a semantic rule based reasoner of the system. The method further includes step 908, at which at least one personal curiosity trait is analyzed and a personalized overall curiosity satisfaction value is assigned to each of the CAPs associated with the user selected field of interest in the graph database. The analysis of curiosity traits and assignment of personalized satisfaction values can be performed by a curiosity trait modeling module of the system. Finally, the method includes step 910, at which a personalized output graph is generated. The personalized output graph can be generated by a personalized output generation module of the system. The personalized output graph can include a subset of CAPs from the graph database associated with the user selected field of interest. Each CAP in the subset being selected by the personalized output generation module based on its assigned personalized satisfaction value.

Systems of the present technology may also connect users within a research oriented social media platform. People with similar interests can search and find each other. Users can collaborate for their research areas. Systems of the present technology may also bring together researchers that has the same curiosity traits and interest domains; or researchers that select resources that are complementary and/or related to each other can find each other for further collaboration. Using systems of the present technology, researchers can form collaboration groups of different sorts and recommend each other resources. The collective curiosity traits of collaboration groups can collectively determine the output resource graph to be displayed to any given user that is a member of the group.

Systems of the present technology may provide RSS feeds, announcements, messaging features, forums, discussion groups and any other standard social media functionalities. The platform may also be connected with popular social media platforms such as Facebook, Twitter and LinkedIN.

The overall graph of intellectual resources and all public data within the system may be used to generate several reports such as curiosity trends, scientific trends, creative ideas, highly rated resources, most prestigious resources, etc. Analytics and graph mining techniques may be applied for extracting insights important for the researchers and the academics community in general. There may also be features that help researchers looking for new ventures to figure out the hottest fields of research and receive personalized recommendations based on both the initial data entered by the user and the background graph database that contains global information.

Systems of the present technology may interact with additional resources to analyze curiosity traits. For example, by interfaces with reference management tools or word processors the system may access the reading list of the user and will analyze his folders and the documents in them in terms of their content or it can directly analyze citations and bibliography. Such analyses may be done with the help of Natural Language Processing and machine learning techniques all of which will be informed by the curiosity modeling. In another example, a system of the present technology may analyze the click stream data of the user especially in online encyclopedias. Systems of the present technology may also offer features such as automated real-time recommendations during the writing of an article. For example, before writing a scientific article, the user may enter inputs such as field of interest, intellectual resources of interest and other profiling information. The system may analyze all those inputs and then keep track of whatever is being written by the users and make personalized CAP recommendations using the context of written text and its analysis through Natural Language Processing and machine learning techniques.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A curiosity-adaptive ambient semantic intelligence system for a scientific collaboration platform for use by at least one user comprising a processor communicatively coupled to a memory device, the system comprising:
   a data receiving module that receives user input from a user before the user authors a work, the user input including at least one user selected field of interest and at least one curiosity trait, the field of interest being selected from at least one of scientific and philosophical subjects, wherein the at least one curiosity trait is derived by the system through a theory based analysis of selectivity patterns of the at least one user according to an operational rule derived from the theory based analysis that comprises a novelty dynamics formula-1, a novelty dynamics formula-2, a completion dynamics formula, an explanation dynamics formula-1, an explanation dynamics formula-2, a challenge-seeking dynamics formula-1, and an interest dynamics formula;
   a graph database comprising machine-processable semantic representations of components of a scientific ontology, wherein the components of the scientific ontology comprise one or more fields of interest, including the user selected field of interest, and one or more Curiosity Attracting Pointers (CAPs) that enable collaboration and communication among users by way of a social media platform, each CAP being associated with at least one field of interest
   a rule-based semantic reasoner that automatically identifies one or more potentially relevant CAPs within the graph database and associates the one or more potentially relevant CAPs with the user selected field of interest in the graph database;
   a curiosity satisfaction value (CSV) calculation module that analyzes the at least one curiosity trait, performs curiosity satisfaction value calculations, and assigns a personalized curiosity satisfaction value to each of the CAPs associated with the user selected field of interest in the graph database, wherein the CSV calculation module calculates and assigns the CSV for each CAP based upon an objective value (OV) component and a curiosity dynamics value (CDV) component, the OV is a weighted sum of parameters comprising a frequency of an entry of a specific resource (popularity), an amount of other graph items linked to a specific resource (centrality), an average subjective significance score given by the users to their corresponding entries (popular score) and an average score given to a resource by a group of user-defined or system-defined prestige group, and weights of the parameters are assigned by the CSV calculation module based on the at least one curiosity trait of the corresponding user, and wherein the user influences the curiosity satisfaction calculations by manually entering one or more of the weights and values for the parameters; and an online data acquisition module that crawls an Internet, pulls data from relevant online data sources, parses the pulled data and formats the data into components for populating the components of the scientific ontology in the graph database, initial scientific ontology stored in the graph database is made up of components entered by a system administrator and the components generated by the online data acquisition module; and a personalized output generation module that generates a personalized output graph comprising a subset of CAPs from the graph database associated with the user selected field of interest, each CAP in the subset being selected by the personalized output generation module based on its assigned personalized curiosity satisfaction value (CSV), and each CAP further consisting of a name of a scientific or philosophic concept or a scientific or philosophic subject or a scientific or philosophic domain or a scientific or philosophic field, a formal description of a succinct statement, a title of an article or a book, a link to a digital resource, or a name of a contributor.

2. The system of claim 1, wherein the components of the scientific ontology further comprise one or more components selected from the group consisting of: relationships between CAPs (CAP-Rs), Curiosity Dynamics Metatags (CDMs), Supplementary Digital Links (SDLs), and Resource Identity Metatags (RIMs).

3. The curiosity-adaptive ambient semantic intelligence system of claim 1, wherein the scientific ontology is designed and transformed by the system administrator, and the users give feedback and make recommendations and change requests to the components of the scientific ontology stored in the graph database.

4. The curiosity-adaptive ambient semantic intelligence system of claim 1, wherein the at least one user scores each of the CAPs based on at least one parameter selected from the group consisting of popularity, a popular score given to a CAP, another score given to a CAP by a prestigious group and a network centrality of a CAP.

5. A method of operating an ambient semantic intelligence system for a scientific collaboration platform for use by at least one user comprising a processor communicatively coupled to a memory device, the method comprising steps of:

receiving user input from a user before the user authors a work to a data receiving module of the system, the user input including at least one user selected field of interest and at least one curiosity trait, the field of interest being selected from at least one of scientific and philosophical subjects, wherein the at least one curiosity trait is derived by the system through a theory based analysis of selectivity patterns of the at least one user according to an operational rule derived from the theory based analysis that comprises a novelty dynamics formula-1, a novelty dynamics formula-2, a completion dynamics formula, an explanation dynamics formula-1, an explanation dynamics formula-2, a challenge-seeking dynamics formula-1, and an interest dynamics formula;

storing in a graph database of the system machine-processable semantic representations of components of a scientific ontology, wherein the components of the scientific ontology comprise one or more fields of interest, including the user selected field of interest, and one or more Curiosity Attracting Pointers (CAPs), each CAP being associated with at least one field of interest, wherein each CAP consists of a name of a scientific or philosophic concept or a scientific or philosophic subject or a scientific or philosophic domain or a scientific or philosophic field, a formal description of a succinct statement, a title of an article or a book, a link to a digital resource, or a name of a contributor;

enabling collaboration and communication among users, including the user, by way of a social media platform;

automatically identifying using a semantic rule based reasoner one or more potentially relevant CAPs within the graph database and associating the one or more potentially relevant CAPs with the user selected field of interest in the graph database;

analyzing the at least one curiosity trait using a curiosity satisfaction value (CSV) alculation module and assigning a curiosity satisfaction value to each of the CAPs associated with the user selected field of interest in the graph database, wherein the CSV calculation module calculates and assigns the CSV for each CAP based upon an objective value (OV) component and a curiosity dynamics value (CDV) component, the OV is a weighted sum of parameters comprising a frequency of an entry of a specific resource (popularity), an amount of other graph items linked to a specific resource (centrality), an average subjective significance score given by the users to their corresponding entries (popular score) and an average score given to a resource by a group of user-defined or system-defined prestige group, and weights of the parameters are assigned by the CSV calculation module based on the at least one curiosity trait of the corresponding user, and wherein the user influences the curiosity satisfaction calculations by manually entering one or more of the weights and values for the parameters; and crawling an Internet using an online data acquisition module and pulling data from relevant online data sources, parsing the pulled data and formatting the data into components and populating the components of the scientific ontology in the graph database, wherein initial scientific ontology stored in the graph database is made up of components entered by a system administrator and the components generated by the online data acquisition module; and generating a personalized output graph using a personalized output generation module of the system, the personalized output graph comprising a subset of CAPs from the graph database associated with the user selected field of interest, each CAP in the subset being selected by the personalized output generation module based on its assigned curiosity satisfaction value (CSV).

6. The curiosity-adaptive ambient semantic intelligence system of claim 5, wherein the scientific ontology is designed and transformed by the system administrator, and the users give feedback and make recommendations and change requests to the components of the scientific ontology stored in the graph database.

7. The curiosity-adaptive ambient semantic intelligence system of claim 5, wherein the at least one user scores each of the CAPs based on at least one parameter selected from the group consisting of popularity, a popular score given to a CAP, another score given to a CAP by a prestigious group and a network centrality of a CAP.

8. An article of manufacture comprising a non-transitory computer readable storage medium having computer readable instructions tangibly embodied thereon, which when executed by a processor of an ambient semantic intelligence system for a scientific collaboration platform for use by at least one user comprising the processor communicatively coupled to a memory device, cause a computer to carry out a plurality of method steps comprising:

receiving user input from a user before the user authors a work to a data receiving module of the system, the user input including at least one user selected field of interest and at least one curiosity trait, the field of interest being selected from at least one of scientific and philosophical subjects, wherein the at least one curiosity trait is derived by the system through a theory based analysis of selectivity patterns of the at least one user according to an operational rule derived from the theory based analysis that comprises a novelty dynamics formula-1, a novelty dynamics formula-2, a completion dynamics formula, an explanation dynamics formula-1, an explanation dynamics formula-2, a challenge-seeking dynamics formula-1, and an interest dynamics formula;

storing in a graph database of the system machine-processable semantic representations of components of a scientific ontology, wherein the components of the scientific ontology comprise one or more fields of interest, including the user selected field of interest, and one or more Curiosity Attracting Pointers (CAPs), each CAP being associated with at least one field of interest, wherein each CAP consists of a name of a scientific or philosophic concept or a scientific or philosophic subject or a scientific or philosophic domain or a scientific or philosophic field, a formal description of a succinct statement, a title of an article or a book, a link to a digital resource, or a name of a contributor;

enabling collaboration and communication among users, including the user, by way of a social media platform;

automatically identifying using a semantic rule based reasoner one or more potentially relevant CAPs within the graph database and associating the one or more potentially relevant CAPs with the user selected field of interest in the graph database;

analyzing the at least one curiosity trait using a curiosity satisfaction value (CSV) calculation module and assigning a personalized curiosity satisfaction value to each of the CAPs associated with the user selected field of interest in the graph database, wherein the CSV calculation module calculates and assigns the CSV for each CAP based upon an objective value (OV) component and a curiosity dynamics value (CDV) component, the OV is a weighted sum of parameters comprising a frequency of an entry of a specific resource (popularity), an amount of other graph items linked to a specific resource (centrality), an average subjective significance score given by the users to their corresponding entries (popular score) and an average score given to a resource by a group of user-defined or system-defined prestige group, and weights of the parameters are assigned by the CSV calculation module based on the at least one curiosity trait of the corresponding user, and wherein the user influences the curiosity satisfaction calculations by manually entering one or more of the weights and values for the parameters; and crawling an Internet using an online data acquisition module and pulling data from relevant online data sources, parsing the pulled data and formatting the data into components and populating the components of the scientific ontology in the graph database, wherein initial scientific ontology stored in the graph database is made up of components entered by system administrators and the components generated by the online data acquisition module; and generating a personalized output graph using a personalized output generation module of the system, the personalized output graph comprising a subset of CAPs from the graph database associated with the user selected field of interest, each CAP in the subset being selected by the personalized output generation module based on its assigned curiosity satisfaction value (CSV).

9. The curiosity-adaptive ambient semantic intelligence system of claim 8, wherein the scientific ontology is designed and transformed by the system administrator, and the users give feedback and make recommendations and change requests to the components of the scientific ontology stored in the graph database.

10. The curiosity-adaptive ambient semantic intelligence system of claim 8, wherein the at least one user scores each of the CAPs based on at least one parameter selected from the group consisting of popularity, a popular score given to a CAP, another score given to a CAP by a prestigious group and a network centrality of a CAP.

* * * * *